United States Patent [19]

Genova et al.

[11] 4,057,759
[45] Nov. 8, 1977

[54] COMMUNICATION RECEIVING APPARATUS

[75] Inventors: Arthur F. Genova, Waltham; Thomas J. Lennon, Burlington, both of Mass.

[73] Assignee: GTE Sylvania Incorporated, Stamford, Conn.

[21] Appl. No.: 698,943

[22] Filed: June 23, 1976

[51] Int. Cl.² .............................................. H04B 1/16
[52] U.S. Cl. ..................................... 325/320; 178/67; 178/88
[58] Field of Search .................... 325/30, 320; 178/67, 178/88

[56] References Cited

U.S. PATENT DOCUMENTS

| 3,368,036 | 2/1968 | Carter | 178/88 |
| 3,423,529 | 1/1969 | O'Neill | 178/88 |
| 3,519,937 | 7/1970 | Hubbard | 178/88 |
| 3,753,114 | 8/1973 | Burley | 325/30 |
| 3,909,721 | 9/1975 | Bussgang | 178/67 |
| 3,931,472 | 1/1976 | Gill | 178/67 |
| 3,947,633 | 3/1976 | Burger | 325/320 |

Primary Examiner—Richard Murray
Assistant Examiner—Michael A. Masinick

Attorney, Agent, or Firm—David M. Keay; Elmer J. Nealon; Norman J. O'Malley

[57] ABSTRACT

Receiving apparatus for processing differential quadrature phase shift keyed (DQPSK) signals. Received 70 MHz IF signals are mixed with a 70 MHz reference frequency to provide quadrature components of each received signal. The resultant of the quadrature components of each signal is converted to a digital representation. The digital representations are sampled at sixteen times the baud rate. Samples are subtracted by two's complement addition and the difference produced by samples from two successive received signals is read out as the data encoded in the signal. The resultant of each two's complement addition is monitored to determine if there is no difference indicating that the samples are from the same received signal or if there is a difference indicating that the samples are from different received signals. The timing of signals which control the operation of the apparatus are adjusted with respect to the timing of received signals so that half the number of resultants of the two's complement addition occurring during a period equal to a baud indicate no difference and half indicate a difference.

10 Claims, 10 Drawing Figures

TABLE 1

CA = I<0
CB = Q<0
CC = Q>I
CD = Q>-I
CE = Q>-2.42I
CF = 2.42Q>-I
CG = -I>-2.42Q
CH = -2.42I>-Q

TABLE 2

QP1 = CA (MSB)
QP2 = CA⊕CB
QP3 = CA⊕CB⊕CC⊕CD
QP4 = CA⊕CB⊕CC⊕CD⊕CE⊕CF⊕CG⊕CH (LSB)

COMMUNICATION RECEIVING APPARATUS

BACKGROUND OF THE INVENTION

This invention relates to communication systems. More particularly, it is concerned with receiving apparatus for processing differential phase shift keyed (DPSK) signals.

Communication systems employing DPSK signals are well-known. Digital data is encoded in the signals by varying the phase of the carrier signal during succeeding signal periods or bauds. That is, the relationship of the phase of one signal to the phase of the preceding signal designates the digital data present in the one signal. In a binary phase system a single bit is encoded in each signal, and in a quadrature phase system two bits of data are encoded in each signal.

In receiving and decoding DPSK signals a reference point must be established with respect to the period of each signal in order to avoid signal transitions when sampling the signals. Time tracking arrangements for analyzing the received signals to determine a proper reference point during each signal have been developed and employed in DPSK communication systems. One typical arrangement employs circuitry for integrating two samples taken during the period of a received signal, comparing the results of integration, and adjusting the times of taking samples until the results are equal; thereby establishing a known reference with respect to the received signal periods. Time tracking arrangements of this general type, however, require many circuit components making them complex and expensive.

SUMMARY OF THE INVENTION

Receiving apparatus for processing differential phase shift keyed signals in accordance with the present invention provides a simple, relatively uncomplicated arrangement for establishing proper reference between the received signals and the time of sampling. The apparatus includes detecting means which produces quadrature components of each received DPSK signal. Digital representations of the resultant of the quadrature components of each signal are derived by analog-to-digital converting means a number of times during the period of a received signal. One of the digital representations of the resultant is stored in a first storage means for a period equal to the period of a received signal.

A subtraction means is coupled to the analog-to-digital converting means and to the first storage means. The subtraction means produces a digital representation of the difference between the digital representation of a resultant stored in the first storage means and each of the digital representations of a resultant which is derived during the period of the digital representation of a resultant is stored in the first storage means. A second storage means which is coupled to the subtraction means stores one of the digital representations of a difference produced during the period of the digital representation of a resultant is stored in the first storage means. A data readout means is coupled to the second storage means to permit reading out of the digital representation of a difference stored in the second storage means.

A control means is coupled to the first storage means, the second storage means, and the data readout means. The control means causes the first and second storage means to store digital representations and causes the readout means to read out the digital representation stored in the second storage means. A timing adjusting means is coupled to the subtraction means and to the control means. The timing adjusting means adjusts the times during the period of a received signal that the control means causes the first and second storage means to store digital representations and the data readout means to read out the digital representation stored in the second storage means. The timing adjusting means adjusting the times of these occurrences in response to the pattern of digital representations of differences produced during a number of periods.

BRIEF DESCRIPTION OF THE DRAWINGS

Additional objects, features, and advantages of receiving apparatus in accordance with the present invention will be apparent from the following detailed discussion together with the accompanying drawings wherein.

Standard well-known symbols and notations are employed throughout the drawings to designate the various logic components.

DETAILED DESCRIPTION OF THE INVENTION

General Description

Figure 1:
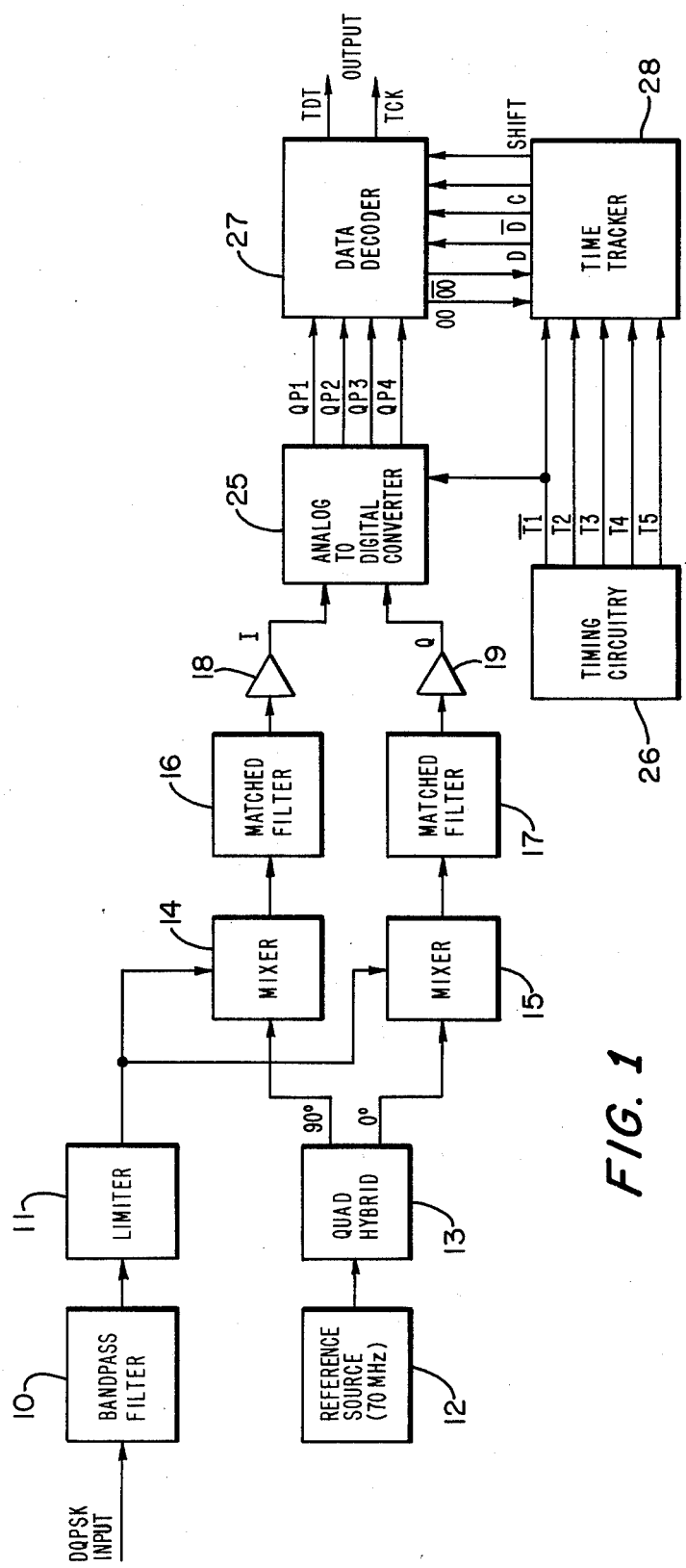
FIG. 1 is a block diagram illustrating receiving apparatus for processing differential quadrature phase shift keyed (DQPSK) signals in accordance with the present invention.

FIG. 1 is a block diagram of receiving apparatus in accordance with the present invention for processing DPSK signals. More specifically, the input signals to the apparatus are differential quadrature phase shift keyed (DQPSK) 70 MHz IF signals at a 32 kilobaud rate. Each received signal is filtered by a bandpass filter 10 and passed through a limiter 11 to provide a signal of fixed amplitude. A 70 MHz sinewave from a reference source 12 is divided into two quadrature signals by a quadrature hybrid 13. The two quadrature signals are mixed with the filtered and amplified IF signals in mixers 14 and 15. The resulting signals are passed through matched filters 16 and 17 and amplifiers 18 and 19 to provide baseband quadrature components I and Q, respectively, of the received signal.

The quadrature components I and Q are applied to an analog-to-digital converter 25. The analog-to-digital converter 25 also receives timing signals from timing circuitry 26 which causes it to sample the I and Q components at a rate of 512 KHz, or sixteen times during each baud or signal period. The analog-to-digital converter 25 converts the I and Q components to a four-bit digital representation QP1-QP4 of the resultant of the quadrature components.

The digital signal QP1-QP4 from the analog-to-digital converter 25 is applied to a data decoder 27. The data decoder stores a digital sample and employs the two's complement addition technique of subtraction to obtain differential measurements between the stored digital sample and each of the sixteen subsequent samples produced by the analog-to-digital converter. The two most significant bits of the sixteenth differential measurement are stored and are subsequently read out. These two bits are a digital measurement of the phase differential between two successive signals and, therefore, designate the two bits of data present in the received signal. The two bits of data TDT are presented at the output together with a timing signal TCK which provides a timing reference.

The data decoder 27 also provides signals labeled OO and $\overline{OO}$ which designate, respectively, whether the difference obtained by subtraction is zero indicating that the two digital samples are the same or is other than zero indicating that the two digital samples are different. This information is supplied to a time tracker 28 which also receives timing signals from the timing circuitry 26. The time tracker 28 analyzes the pattern of OO and $\overline{OO}$ signals from the data decoder 27 and produces control signals D, $\overline{D}$, C, and SHIFT which cause the data decoder to sample and received signal and read out the output data bits at the proper times with respect to the period of each received signal.

TIMING CIRCUITRY

Figure 3:
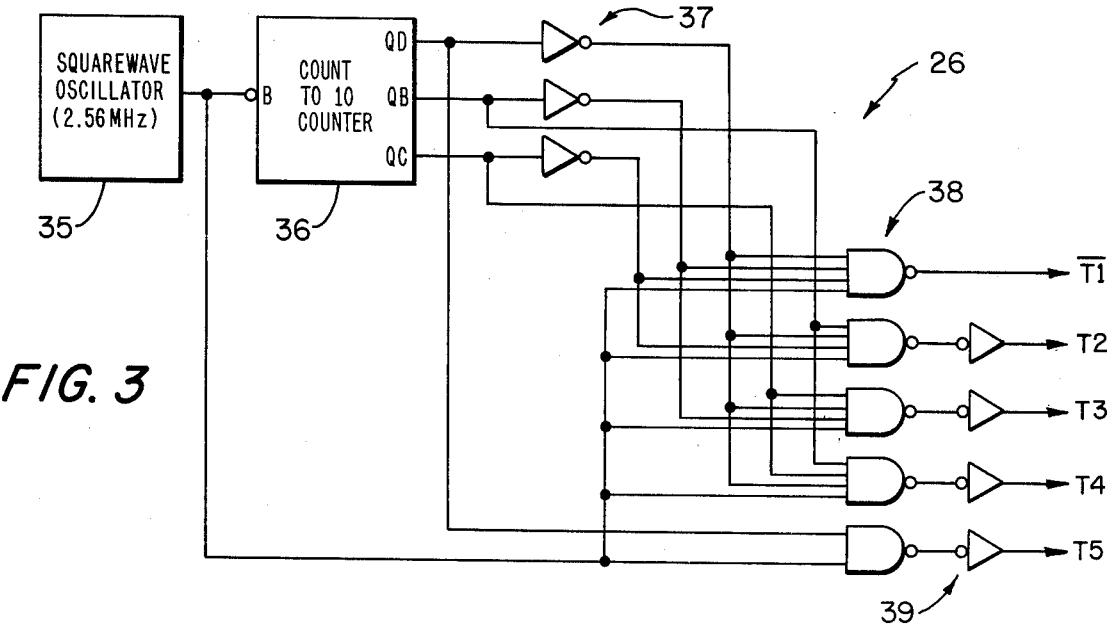
FIG. 3 is a logic diagram of timing circuitry employed in the apparatus.
Figures 7A, 7B:
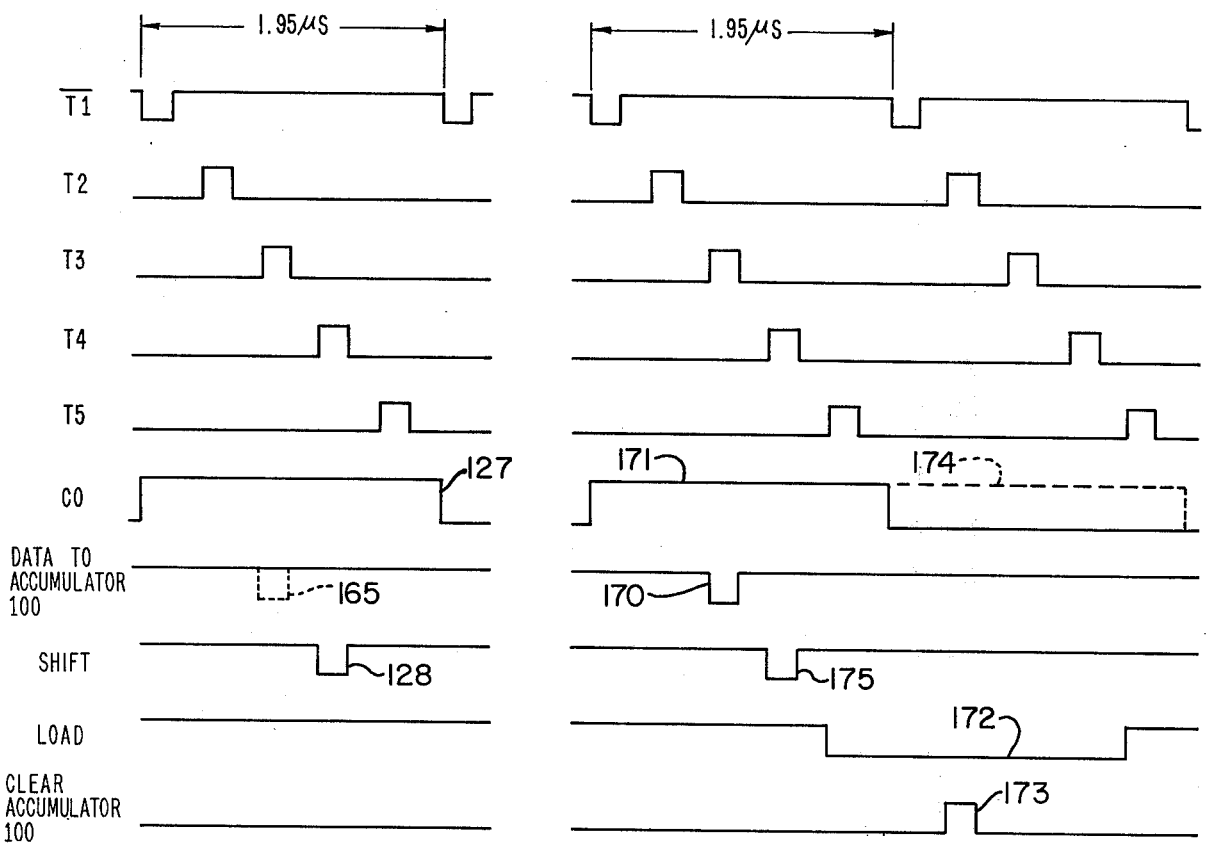
FIGS. 7A and 7B are timing diagrams which are useful in explaining the operation of the apparatus.

The timing circuitry 26 is illustrated in the logic diagram of FIG. 3. The timing circuitry employs a squarewave oscillator 35 which produces pulses at a rate of 2.56 MHz. The squarewave pulses are applied to a count-to-10 counter 36 and the outputs from the counter are applied directly and indirectly by way of inverters 37 to an arrangement of NAND gates 38 and inverters 39 to provide a set of five phase clock pulses at 512 KHz. The clock pulses T1, T2, T3, T4, and T5 are illustrated in FIGS. 7A and 7B. The 512 KHz rate of the clock pulses is sixteen times the baud rate of the received signals.

DETECTION OF QUADRATURE COMPONENTS

As explained previously the input to the receiving apparatus of FIG. 1 is a DQPSK 70 MHz IF signal. The input signals change in phase at a 32 kilobaud rate. The data content of each baud is two data bits, thus providing a data rate of 64 kilobits per second. The received signals are filtered by the bandpass filter 10 and pass through the limiter 11 to provide signals of fixed amplitude. A 70 MHz sinewave is produced by the reference source 12. The reference frequency from the reference source is applied to the quadrature hybrid 13 which splits the sinewave into two quadrature signals. These quadrature signals are separately mixed with the filtered and amplified IF signals in mixers 14 and 15. The outputs of the mixers 14 and 15 are the baseband quadrature components of the received signal.

The quadrature components are separately passed to finite integrators (matched filters) 16 and 17 to optimize the ratio of peak signal to RMS noise. The filtered quadrature components are amplified to a desired level by amplifiers 18 and 19. The resulting quadrature components are labeled I and Q. The elements as described briefly hereinabove for producing the quadrature components of I and Q from the received IF signals are well-known items of straightforward design which are widely employed in the communication art.

ANALOG-TO-DIGITAL CONVERTER

Figure 4:
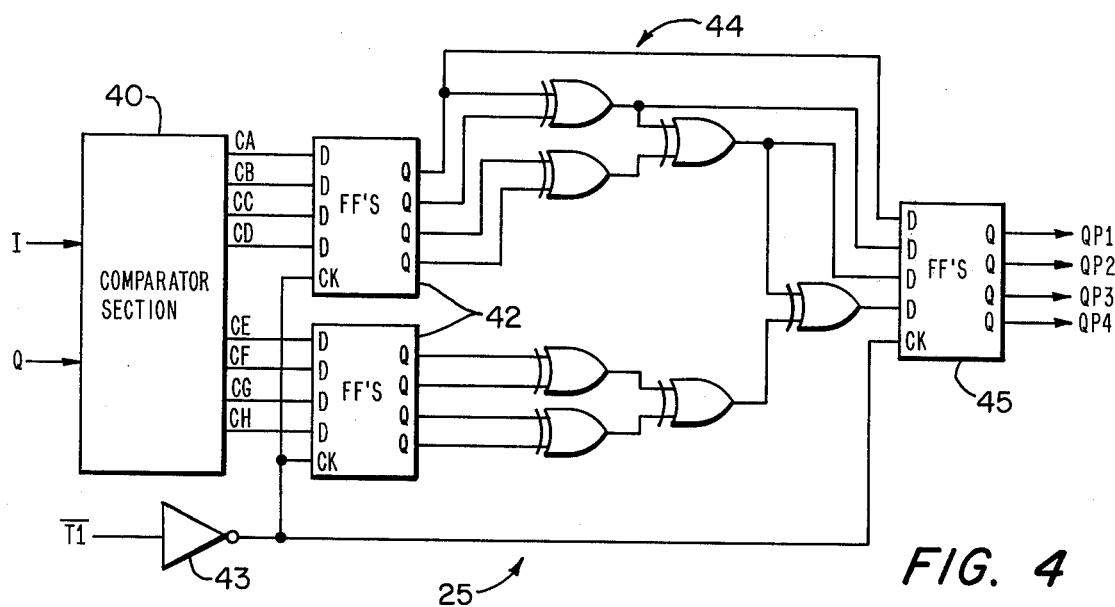
FIG. 4 is a logic diagram of an analog-to-digital converter employed in the apparatus.
Figure 4A:
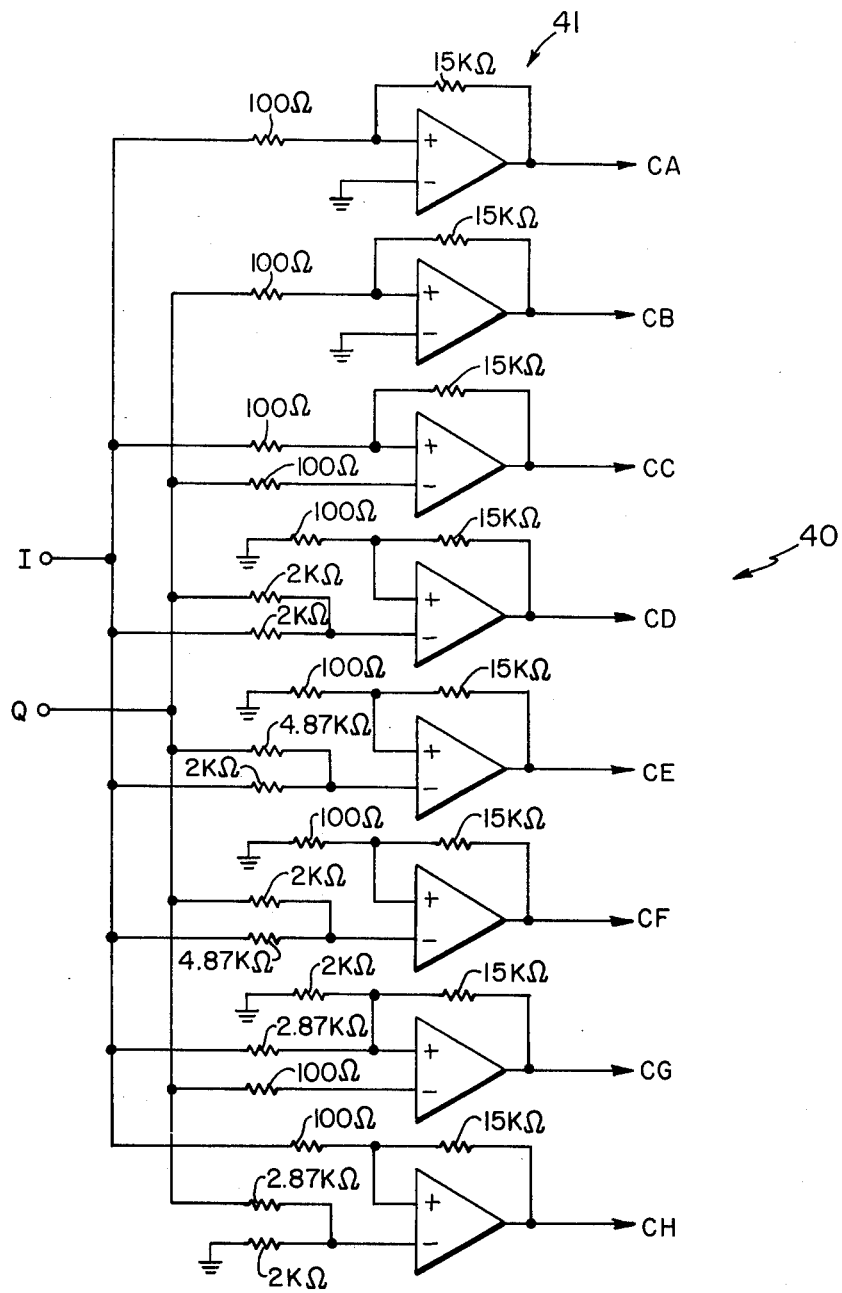
FIG. 4A is a detailed circuit diagram of a portion of the analog-to-digital converter shown in FIG. 4.

The analog-to-digital converter 25 is illustrated in the logic diagram of FIG. 4. The quadrature components I and Q are applied to a comparator section 40 of the analog-to-digital converter 25. As illustrated in detail in FIG. 4A the comparator section 40 includes an array of comparator circuits 41, for example, standard commercially-available type 734 comparators, together with suitable input resistances having values as shown. The comparator section 40 performs a set of predefined comparative measurements on the I and Q components to produce a set of digital bits CA-CH as defined in table 1 of FIG. 2. The digital bits CA-CH are sampled at the 512 KHz rate (sixteen times per baud) and stored in a first set of flip-flops 42 by the action of $\overline{T1}$ clock pulses applied through an inverter 43.

The outputs of flip-flops 42 are applied to an array of exclusive-OR gates 44. The digital bits CA-CH are operated on by the exclusive-OR gates in accordance with table 2 of FIG. 2 to produce digital bits QP1-QP4. These bits are stored in a second set of flip-flops 45 on the inverted $\overline{T1}$ clock pulse.

Figure 2:
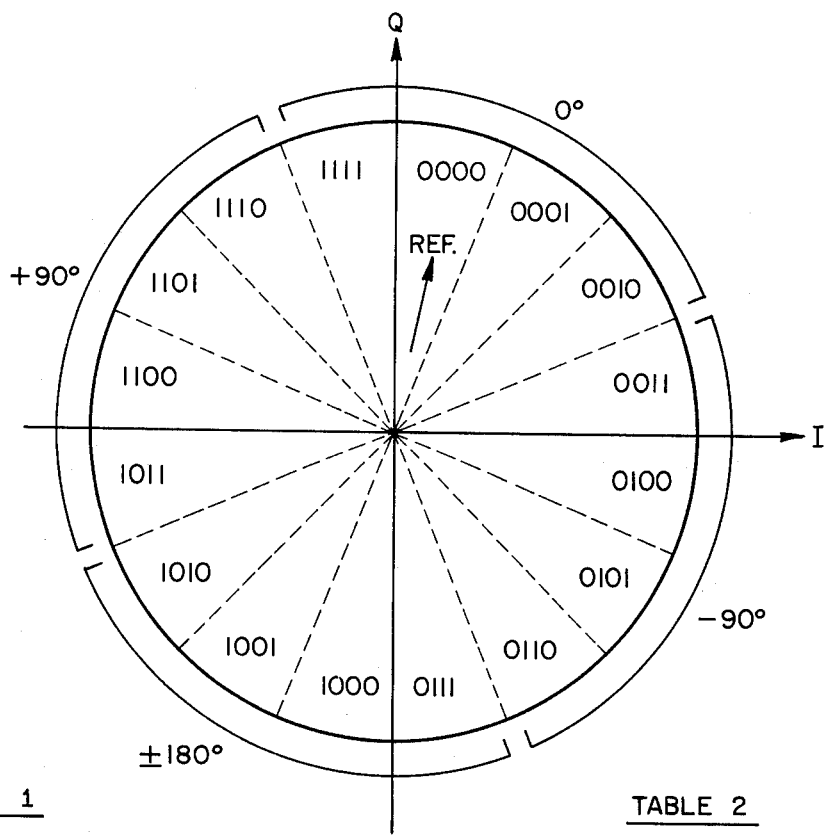
FIG. 2 is a diagram and two tables which are useful in explaining the operation of the apparatus of FIG. 1.

The digital bits QP1-QP4 are a digital representation of a position vector which is the resultant of the I and Q components. The diagram of FIG. 2 illustrates the relationship between the vector resultant of the I and Q components and the sixteen possible values of the digital representations QP1-QP4. The bits QP1-QP4 thus indicate the relative phase between the 70 MHz received IF signal and the 70 MHz reference frequency. The bits QP1-QP4 are produced at the rate of the quadrature components I and Q of the received signals which is 512 KHz, sixteen times the baud rate.

DATA DECODER

Figure 5:
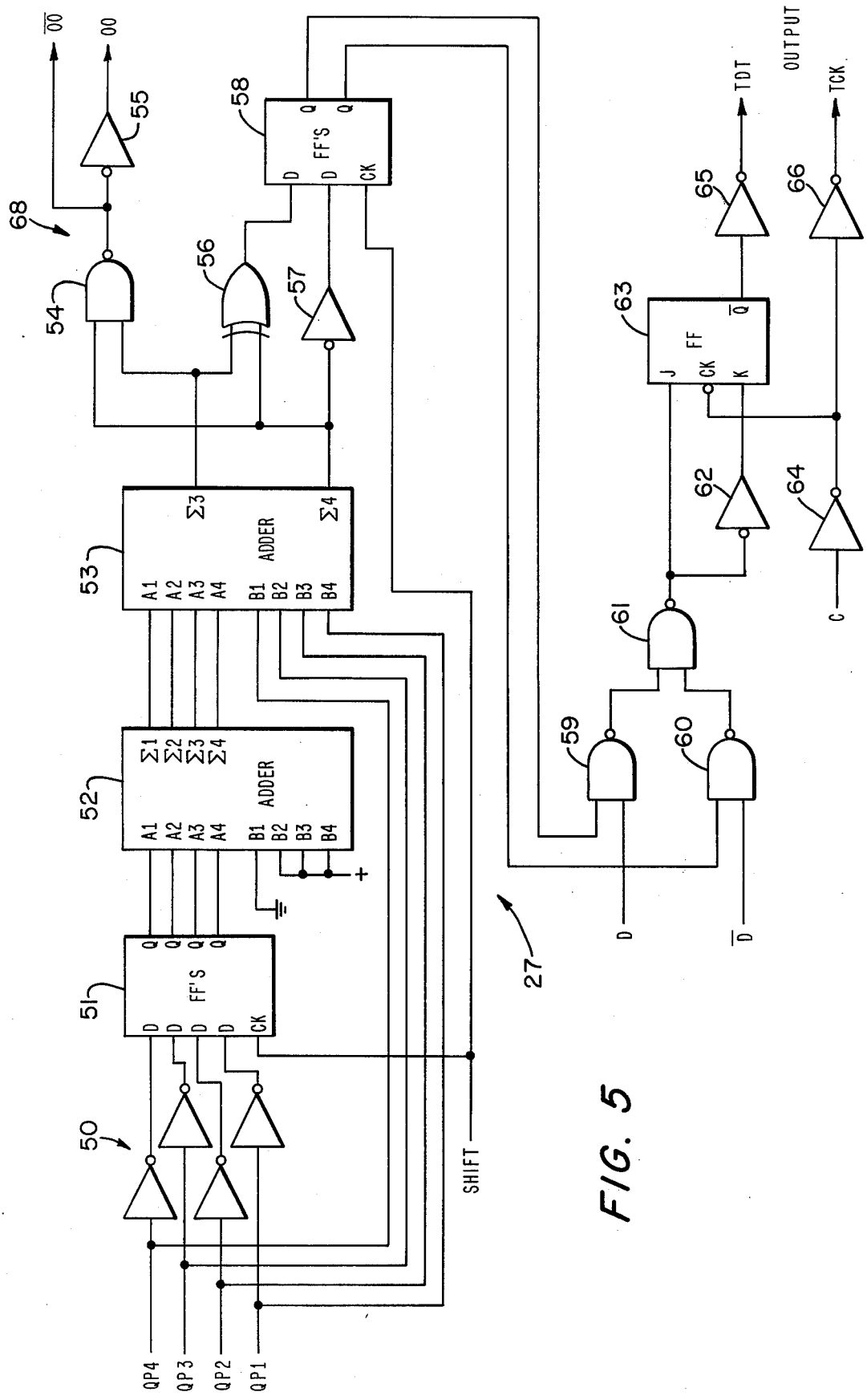
FIG. 5 is a logic diagram of a data decoder of the apparatus.

The data decoder 27 is illustrated in detail in the logic diagram of FIG. 5. The digital representation of the resultant of the quadrature components, data bits QP1-QP4, are applied through inverters 50 to a first set of flip-flops 51. The bits are loaded into flip-flops 51 on a SHIFT pulse which, as will be explained hereinbelow, occurs on a T4 clock pulse once during each baud.

The data stored in the flip-flops 51 is applied as the A inputs to a first adder 52. The B inputs to the first adder 52 are fixed at the logic levels shown so that the output of the first adder 52 is a two's complement of the A input signal. The two's complement output signal from the first adder 52 is applied as the A inputs to a second adder 53. The B inputs to the second adder 53 are data bits QP1-QP4 directly from the second set of flip-flops 45 (FIG. 4) of the analog-to-digital converter 25. As is well-known the two's complement addition of binary numbers is equivalent to subtraction, thus the two output bits taken from the second adder 53 are the two most significant bits of the difference between data bits QP1-QP4 stored in the first set of flip-flops 51 and the data bits QP1-QP4 in the second flip-flop 45 of the analog-to-digital converter. Since the data in the flip-flops 51 is changed only once per baud, the data therein is measured against sixteen samples from the analog-to-digital converter.

The output bits from the second adder 53 are applied to a difference or match-mismatch detector 68 which is an arrangement of a NAND gate 54 and an inverter 55. The match-mismatch detector 68 produces a signal OO if there is no difference between the two sets of data bits QP1-QP4 undergoing subtraction; that is, if they are the same. If there is a difference, the two sets of bits QP1-QP4 are not the same, and the match-mismatch detector 68 produces a signal $\overline{OO}$.

The two most significant output bits from the second adder 53 represent the differential phase shift between the vectors represented by the bits stored in the first flip-flops 51 and the bits being derived by the analog-to-digital converter. These bits are applied to a decoder consisting of an exclusive-OR gate 56 and an inverter 57 as shown. Once every baud a SHIFT pulse loads the two data bits from the decoder into a second set of flip-flops 58. Since the second flip-flops 58 are loaded the period of one baud after the first set of flip-flops 51 are loaded, the data bits in the second flip-flop 58 correspond to the differential phase shift between the vectors from the previous baud and from the present baud.

The outputs of the second set of flip-flops 58 are applied by way of an arrangement of NAND gates 59, 60, and 61 to a J-K output flip-flop 63. The NAND gates are controlled by signals D and $\overline{D}$ (FIG. 8) which are produced by the time tracker 28 as will be explained hereinbelow. These signals cause the gates 59, 60, and 61 to pass one of the data bits during a period equal to one-half a baud and the other bit during the subsequent period equal to one-half a baud. The data bits are applied to the J input directly and indirectly to the K input through an inverter 62. The J-K flip-flop 63 is clocked by C pulses (FIG. 8) at twice the rate of the D and $\overline{D}$ pulses. The C pulses are also produced by the time tracker 28 as will be explained hereinbelow and are applied to the flip-flop 63 through an inverter 64. The $\overline{Q}$ output of the flip-flop 63 is inverted by an inverter 65 to produce the output signal TDT of two bits of decoded data in series for each received signal. The inverted C pulses are inverted by another inverter 66 to become the TCK output clock signal which is a timing reference for the data output TDT.

TIME TRACKER

Figure 6:
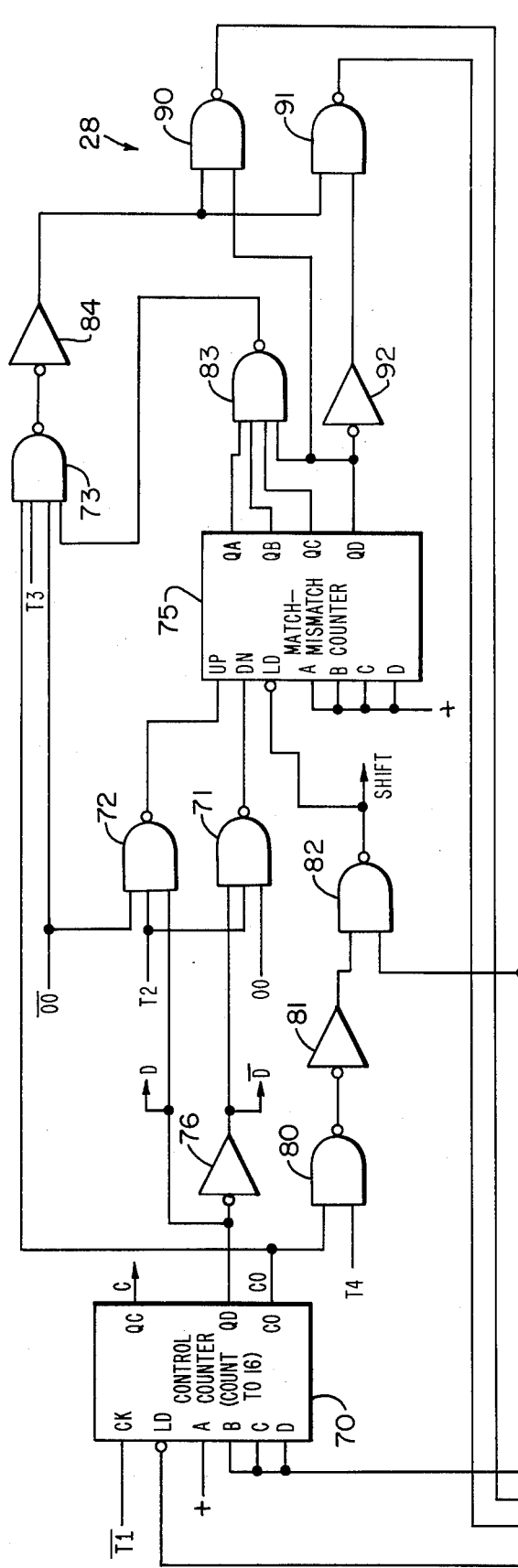
FIG. 6 is a logic diagram of a time tracker of the apparatus.
Figure 6:
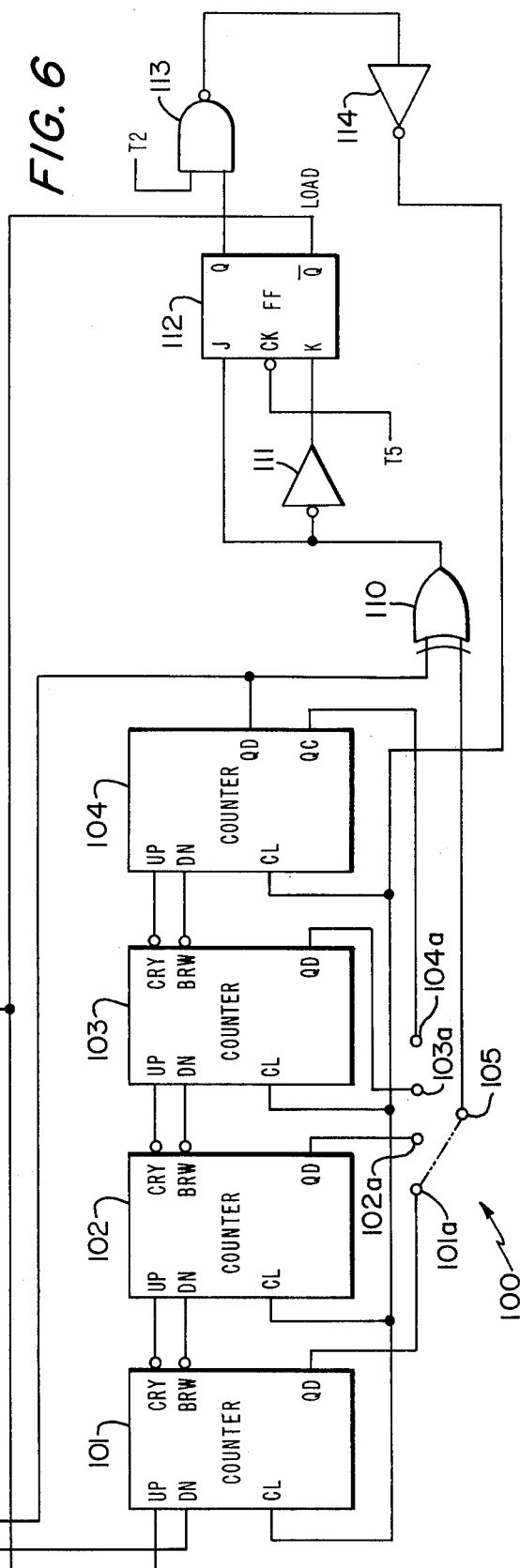

The adjusting of the timing of the operations of the apparatus with respect to the timing of the received signals is controlled by the time tracker 28 which is shown in detail in the logic diagram of FIG. 6. The signals C, D, $\overline{D}$, and SHIFT which actuate and control the operations of elements in the data decoder 27 as explained hereinabove are initiated by a count-to-16 control counter 70. The control counter 70 repeatedly counts through a sequence of sixteen $\overline{T1}$ clock pulses. The C signal (FIG. 8) is taken at the QC output of the control counter 70. The D signal (FIG. 8) is taken at the QD output, and passed through an inverter 76 to produce the $\overline{D}$ signal. As will be explained in detail hereinbelow, the control counter 70 may be retarded or advanced in response to the accumulation of data within the time tracker indicating that the timing of the pulses C, D, $\overline{D}$, and SHIFT needs to be adjusted.

Figure 8:
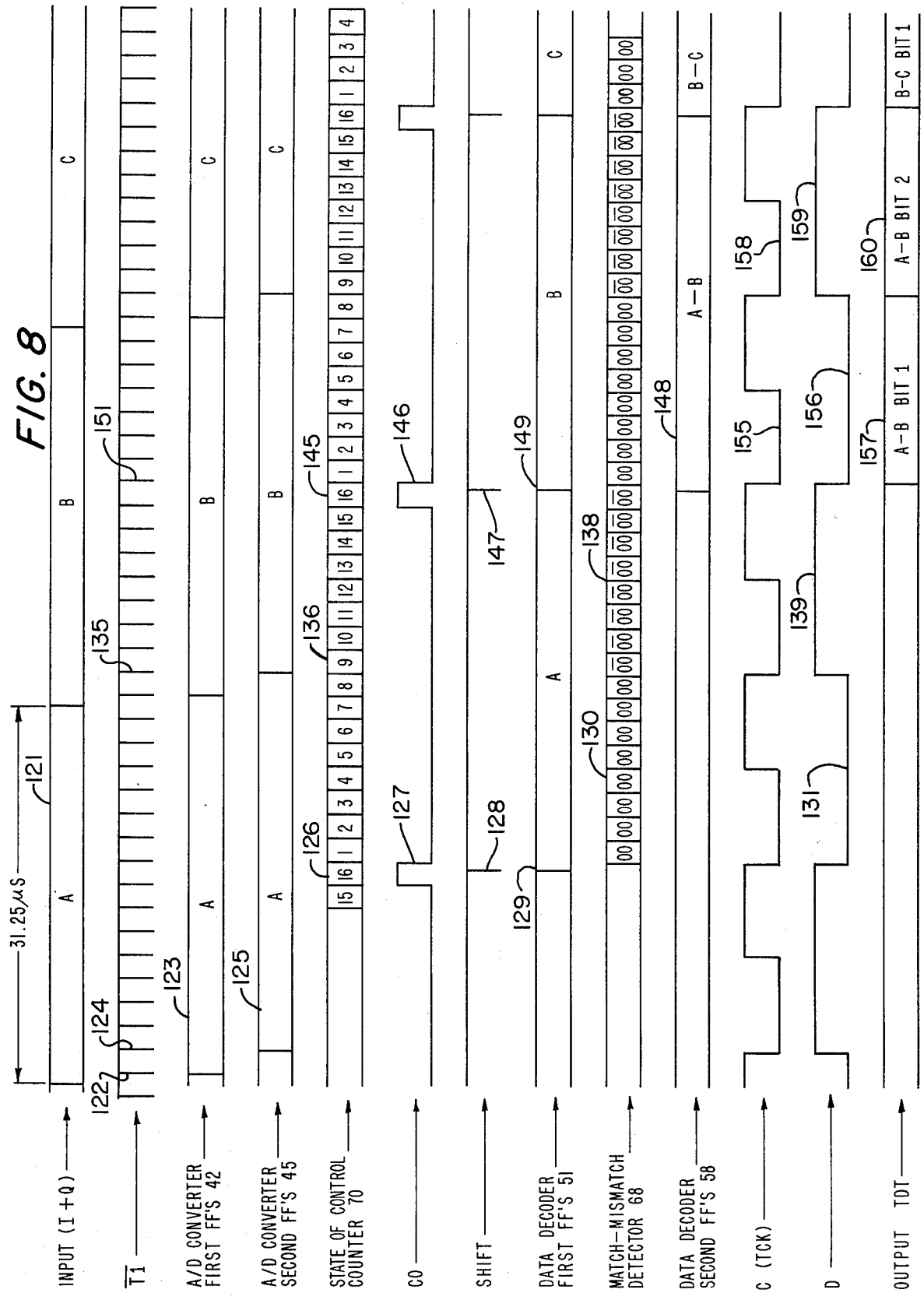
FIG. 8 is a timing diagram on a different scale for providing a better understanding of the operation of the apparatus.

As shown in FIGS. 7A, 7B, and 8 a SHIFT pulse is produced on the T4 clock pulse when the carry output CO signal from the control counter 70 is present. The CO signal is present while the control counter is in its sixteenth state containing a count of all 1's (FIG. 8). The CO signal is applied to a NAND gate 80, an inverter 81, and a NAND gate 82 in series to produce the SHIFT pulse. The NAND gate 82 acts to inhibit the production of a SHIFT pulse if a LOAD signal is present as will be explained hereinbelow.

The match-mismatch signals 00 and $\overline{00}$ from the match-mismatch detector 68 (FIG. 5) of the data decoder 27 are applied to the time tracker as inputs to NAND gates 71 and 72, respectively. The $\overline{00}$ signal is also applied to a NAND gate 73. The NAND gates 71 and 72 receive the $\overline{D}$ and D signals, respectively, and both NAND gates 71 and 72 are clocked on the T2 clock pulse. The outputs of NAND gates 71 and 72 are applied to the down and up inputs, respectively, of an up/down match-mismatch counter 75. A count of all 1's is loaded into the match-mismatch counter 75 on each SHIFT pulse which occurs, as explained previously, at the band rate. Thus, the match-mismatch counter 75 counts downward from the initial count of all 1's on the T2 clock pulse for each 00 signal during a $\overline{D}$ pulse. As shown in FIG. 8 the $\overline{D}$ pulse is present during the first eight of the sixteen states of a sequence of the cntrol counter 70. The match-mismatch counter 75 counts upward on the T2 clock pulse for each $\overline{00}$ signal during a D pulse which, as shown in FIG. 8, is present during the last eight states of a sequence of the control counter 70.

As will be apparent from the discussion herein, if during a sequence of sixteen sets of clock pulses the control counter 70 is properly in phase with the received signals, the match-mismatch deterctor 68 will produce eight 00 signals followed by eight $\overline{00}$ signals. Thus, the match-mismatch counter 75 will count downward from a count of all 1's for eight signals and then upward for eight signals to produce an output of all 1's at the end of the sequence. If the outputs at the end of a sequence are other than all 1's, it is an indication that the number of 00 and $\overline{00}$ signals counted during a sequence were not equal and that the control counter 70 is out of phase with the received signals.

The outputs of the match-mismatch counter 75 are applied to a NAND gate 83 which its output connected to NAND gate 73. The $\overline{00}$ signals, T3 clock pulses, and CO pulses are also inputs to NAND gate 73. The output of NAND gate 73 is inverted by inverter 84 and applied to NAND gates 90 and 91. The QD output of the match-mismatch counter 75 is connected directly to NAND gate 90 and through an inverter 92 to NAND gate 91.

Thus, on the T3 clock pulse when the control counter 70 contains a count of all 1's producing a CO pulse and a $\overline{00}$ signal is present if the outputs of the match-mismatch counter 75 are other than all 1's, NAND gate 73 produces a signal enabling NAND gates 90 and 91. If the QD output of the match-mismatch counter 75 is a 1, indicating that more 00 than $\overline{00}$ signals were counted during the sequence, a signal is produced by NAND gate 90. If the QD output of the match-mismatch counter 75 is a 0, indicating that more $\overline{00}$ than 00 signals were counted, a signal is produced by NAND gate 91.

The outputs of NAND gates 90 and 91 are connected to an accumulator 100 having four up/down counters 101, 102, 103, and 104. The counters are each count-to-16 counters and are connected in series as shown in FIG. 6. The output of NAND gate 90 is connected to the down input of counter 101 and the output of NAND gate 91 is connected to the up input of counter 101. The QD outputs of counters 101, 102, and 103 and the QC output of counter 104 are connected to terminals 101a, 102a, 103a, and 104a, respectively. One or the other of these terminals is connected directly to terminal 105, as indicated by a shorting bus shown in phantom between terminals 101a and 105. The connection may be made from terminal 105 to any one of terminals 101a, 102a, 103a, or 104a as desired in order to select the amount of data which is to be accumulated by the accumulator in order for it to produce a response, as will be explained hereinbelow. The QD output of counter 104 is connected to the B, C, and D inputs of the control counter 70 and a positive potential or logic 1 is applied to the A input.

The QD output of counter 104 and terminal 105 are the inputs to an exclusive-OR gate 110. The output of exclusive-OR gate 110 is applied directly to the J input of a J-K flip-flop 112 and through inverter 111 to the K input. The J-K flip-flop 112 is clocked by T5 clock pulses. The $\overline{Q}$ output of the J-K flip-flop 112 provides the LOAD signal which is applied to the LOAD terminal of the control counter 70 and also to NAND gate 82 to inhibit the producing of a SHIFT pulse when a LOAD pulse is present. The Q output of the J-K flip-flop 112 is connected to a NAND gate 113. The other input to NAND gate 113 is the T2 clock pulse. The output of NAND gate 113 is inverted by an inverter 114 and applied to the up/down counters 101, 102, 103, and 104 for clearing all the counters to all 0's.

If during a sequence of sixteen sets of clock pulses the match-mismatch counter 75 detects more 00 than $\overline{00}$ signals, NAND gate 90 produces an output signal on the T3 clock pulse. This signal causes the counters of the accumulator 100 to count down by one from their accumulated count. If during a sequence the number of $\overline{00}$ signals exceeds the number of 00 signals, NAND gate 91 produces an output signal causing the accumulator 100 to count up by one.

If the accumulator 100 counts a net predetermined number of down input pulses, it produces a logic 0 at the one of the terminals 101a, 102a, 103a, or 104a which is directly connected to terminal 105. The QD output of counter 104 was changed to a logic 1 on the first count down from the cleared condition of all 0's. Thus, the J-K flip-flop 112 is triggered from the reset to the set condition on the T5 clock pulse. A LOAD signal (FIG. 7B) is produced at the $\overline{Q}$ output of the flip-flop 112. On the next $\overline{T1}$ pulse the control counter 70 loads all 1's rather than add a count to becom 0's. Thus, the control counter 70 and consequently the signals C, D, $\overline{D}$, and SHIFT it initiates are retarded by 1/16th of a baud with respect to the received signals. The LOAD signal inhibits NAND gate 82 preventing the generation of another SHIFT pulse. On the subsequent T2 clock pulse the counters 101, 102, 103, and 104 of the accumulator are cleared to all 0's and on the subsequent T5 clock pulse the J-K flip-flop 112 is reset terminating the LOAD pulse.

If the accumulator 100 counts a net predetermined number of up input pulses from NAND gate 91, it produces a logic 1 at the one of the terminals 101a, 102a, 103a, or 104a which is connected to terminal 105. Since the QD output of counter 104 is a logic 0, the J-K flip-flop 112 is triggered to the set condition on the T5 clock pulse and produces a LOAD signal (FIG. 7B). On the next T1 clock pulse the control counter 70 loads 0001 rather than add a count to become all 0's. Thus, the control counter 70 and consequently the signals C, D, $\overline{D}$, and SHIFT that the control counter initiates are advanced by 1/16th of a baud with respect to the received signals. On the subsequent T2 clock pulse the counters 101, 102, 103, and 104 of the accumulator are cleared to all 0's and on the T5 clock pulse the J-K flip-flop 112 is reset terminating the LOAD pulse.

DETAILED OPERATION

The operation of the apparatus as described in processing received signals and in properly adjusting the timing of the control signals may best be understood by reference to the timing diagrams of FIGS. 7A, 7B, and 8. FIG. 7A illustrates various signals at the termination of a counting sequence of the control counter 70 under usual conditions, and FIG. 7B illustrates the same signals at the termination of a counting sequence when the accumulator 100 contains a net count sufficient to produce a LOAD signal. FIG. 8 illustrates various conditions in the apparatus from the time a signal is received until its decoded data bits are produced at the output when the timing is properly adjusted.

The I and Q components of a received signal A 121 (FIG. 8) are present during a baud period of 31.25 microseconds. On the first T1 clock pulse 122 subsequent to the beginning of signal A, the digital signals CA-CH derived from the I and Q components are loaded into the first set of flip-flops 42 of the analog-to-digital converter 25 (FIG. 4) as shown at 123. On the next $\overline{T1}$ clock pulse 124 the digital representation QP1-QP4 of the resultant of the I and Q components of signal A is loaded into the second set of flip-flops 45 of the analog-to-digital converter 25 as indicated at 125.

For purposes of discussion it is assumed that the timing relationship between the received signals and the control counter 70 are properly synchronized. When the control counter 70 reaches the 16th state of all 1's 126, it produces a CO signal 127. As shown in FIG. 8 and in more detail in FIG. 7A, on the T4 clock pulse a SHIFT pulse 128 is produced. This pulse loads the digital representation QP1-QP4 of signal A into the first set of flip-flops 51 in the data decoder 27 (FIG. 5) as shwon at 129 in FIG. 8. At the same time the match-mismatch counter 75 is loaded with all 1's.

The contents of the flip-flops 51 are applied to the first adder 52 in the data decoder 27. During each subsequent set of clock pulses the sample QP1-QP4 produced by the analog-to-digital converter 25 is applied to the second adder 53. The match-mismatch detector 68 (FIG. 5) produces a 00 signal if the inputs to the two adders are the same and a $\overline{00}$ signal if they are different. As shown in FIG. 8 the first eight samples from the second set of flip-flops 45 of the analog-to-digital converter 25 are of signal A and, therefore, are the same as the contents of the flip-flops 51 so that the match-mismatch detector 68 produces 00 signals 130. The match-mismatch counter 75 counts downward on the T2 clock pulse for each 00 signal since the $\overline{D}$ signal is present. (The D signal is at logic 0 as shown at 131.)

On the $\overline{T1}$ clock pulse 135 which places the control counter 70 in the 9th state 136 the digital representation QP1-QP4 pertaining to the succeeding signal B is present in the second set of flip-flops 45 of the analog-to-digital counter 25 as indicated at 137. Thus during counts 9 through 16 of the control counter 70 the inputs to the adders are different and the match-mismatch detector 68 produces $\overline{00}$ signals 138. The match-mismatch counter 75 counts upward on the T2 clock pulse for each $\overline{00}$ signal since the D signal 139 is present.

On the 16th set of clock pulses the count in the control counter 70 is all 1's 145 and a CO pulse 146 is produced. Since over the sequence of sixteen sets of clock pulses the match-mismatch counter 70 has counted downward for eight 00 signals and then upward for eight $\overline{00}$ signals, there is no net change in its contents which is all 1's. Thus on the T3 clock pulse NAND gates 90 and 91 remain inhibited and no signal is transmitted to the accumulator 100. On the T4 clock pulse a SHIFT pulse 147 is produced. This pulse clocks the second set of flip-flops 58 in the data decoder 27 to receive the two bits of output data from the adder 53 as decoded by exclusive-OR gate 56 and inverter 57 as shown at 148. These two bits are the decoded difference in phase between the received signals A and B. The SHIFT pulse 147 also causes the first set of flip-flops 51 of the data decoder 27 to receive the digital representation QP1–QP4 of the resultant of the I and Q components of signal B as shown at 149.

On the subsequent $\overline{T1}$ clock pulse when the contents of the control counter 70 changes from all 1's to all 0's, the negative-going C pulse 155 from the control counter 70 triggers the J–K output flip-flop 63 to the set condition. Since the $\overline{D}$ signal is high and the D signal 156 is low, NAND gates 59, 60, and 61 cause the first bit of the two bits stored in the second set of flip-flops 58 to be stored in the output flip-flop 63. This bit appears at the output TDT 157. On the next negative-going C pulse 158 the D signal becomes low and the $\overline{D}$ signal 159 becomes high causing the second data bit in the second set of flip-flops 58 to be loaded into the output flip-flop 63. This bit appears at the output TDT 160. The C signal is also an output signal TCK which provides a timing reference for the output data bits TDT.

The foregoing explanation is concerned with operation of the apparatus when the control pulses are properly synchronized with received signals so as to provide proper timing relationship between the received signals and the output data bits. If, however, the control signals CO, SHIFT, C. D, and $\overline{D}$ are occurring too early with respect to the received signals, the number of 00 signals counter during a sequence of sixteen sets of clock pulses exceeds the number of $\overline{00}$ signals. Thus, during the CO signal 127 (FIG. 7A) on the 16th state of the control counter 70, the QD output of the match-mismatch counter 75 is 1. The outputs of the match-mismatch counter 75 enable NAND gate 83 and therefore NAND gate 73. Thus, on the T3 clock pulse NAND gate 90 produces a pulse 165 in FIG. 7A to the down input of counter 101 of the accumulator 100. The first such down signal to the previously cleared accumulator changes its entire contents from all 0's to all 1's.

When sufficient down signals have been counted, the counter terminal 101a, 102a, 103a, or 104a which is connected to terminal 105 becomes 0. As indicated in FIG. 7B this event occurs on a T3 clock pulse 170 during a CO pulse 171. The usual SHIFT pulse 175 occurs on the T4 clock pulse. Then on the T5 clock pulse the 1 at the QD output of counter 104 and the 0 at terminal 105 cause the J–K flip-flop 112 to be triggered to the set condition producing a LOAD signal 172. Since the QD output of counter 104 is 1, on the next $\overline{T1}$ clock pulse the control counter 70 will load all 1's or, in effect, not advance from the previous count of all 1's. Thus, an extra count is added to the next sequence of the control counter 70 retarding the control signals CO, SHIFT, C, D, and $\overline{D}$ by 1/16th of a baud. On the T2 clock pulse, the NAND gate 113 and inverter 114 produce a clear pulse 173 to the counters 101–104 of the accumulator 100 resetting their contents to all 0's. The repeat of the all 1's state in the control counter 70 repeats the CO signal as indicated at 174 in FIG. 7B. However, the LOAD signal 172 inhibits NAND gate 82 and no SHIFT pulse is produced on the T4 clock pulse. On the T5 clock pulse the J–K flip-flop 112 is triggered to the reset condition and the LOAD signal 172 terminates.

If, on the other hand, the control signals CO, SHIFT, C, D, and $\overline{D}$ are occurring too late with respect to the received signals, the number of 00 signals counted during a sequence of the control counter 70 is less than the number of $\overline{00}$ signals. Thus, during the CO signal 127 (FIG. 7A) the QD output of the match-mismatch counter 75 is 0, and on the T3 clock pulse NAND gate 91 passes a pulse to the up input a counter 101 of accumulator 100 as indicated at 165 of FIG. 7A. The counters of the accumulator 100 count upward on each up signal from the cleared condition of all 0's. When sufficient up signals have been counted, the counter terminal 101a, 102a, 103a, or 104a which is connected to terminal 105 becomes 1. This event occurs on a T3 clock pulse as indicated at 170 in FIG. 7B. The usual SHIFT pulse 175 occurs on the T4 pulse. On the T5 clock pulse the 0 at the QD output of counter 104 and the 1 at terminal 105 cause the J–K flip-flop 112 to be set producing a LOAD signal 172. On the next $\overline{T1}$ clock pulse the control counter 70 loads bits 0001 setting the control counter to the second state rather than to the first state of all 0's. Thus, during the next sequence the control counter counts through one less state advancing the control signals CO, SHIFT, C, D, and $\overline{D}$ by 1/16th of a baud. The accumulator 100 is cleared by a clear pulse 173 on the next T2 clock pulse, and the J–K flip-flop 112 is reset on the T5 clock pulse terminating the LOAD signal 172.

While there has been shown and described what is considered a preferred embodiment of the present invention, it will be obvious to those skilled in the art that various changes and modifications may be made therein without departing from the invention as defined by the appended claims.

What is claimed is:

1. Receiving apparatus for processing received differential phase shift keyed signals comprising detecting means for producing quadrature components of each received signal;

analog-to-digital converting means coupled to said detecting means for deriving digital representations of the resultant of the quadrature components of each signal a number of times during the period of a received signal; the period of a received signal being the duration of the time period during which a received signal is being received;

first storage means coupled to the analog-to-digital converting means for storing a digital representation of a resultant for a period equal to the period of a received signal;

subtraction means coupled to said analog-to-digital converting means and to said first storage means for producing a digital representation of the difference between the digital representation of the resultant stored in the first storage means and each subsequently derived digital representation of a resultant during the period the digital representation of the resultant is stored in the first storage means;

second storage means coupled to said subtraction means for storing one of the digital representations of a difference produced during the period the digital representation of a resultant is stored in the first storage means;

data readout means coupled to said second storage means for reading out the digital representation of a difference stored in said second storage means;

said first storage means being operable to store a digital representation therein in response to an actuating signal;

said second storage means being operable to store a digital representation therein in response to an actuating signal;

said data readout means being operable to read out the digital representation stored in said second storage means in response to an actuating signal;

control means coupled to said first storage means, said second storage means, and said data readout means for producing said actuating signals to the first storage means, second storage means, and data readout means during each period of a received signal; and timing adjusting means coupled to said subtraction means and said control means for adjusting the times during the period of a received signal that the control means produces the actuating signals to the first and second storage means and to the data readout means; the timing adjusting means adjusting said times in response to the digital representations of differences produced by the subtraction means during a number of periods, each period being equal to the period of a received signal.

2. Receiving apparatus in accordance with claim 1 wherein the signals received at the detecting means are IF signals at a predetermined frequency; and said detecting means includes a source of reference frequency equal to said predetermined frequency;

quadrature hybrid means coupled to said source for producing two quadrature signals of the reference frequency; and mixing means coupled to the quadrature hybrid means for combining the IF signal with each of the two quadrature signals to provide the quadrature components of each received signal.

3. Receiving apparatus in accordance with claim 2 wherein said analog-to-digital converting means includes an array of comparator means coupled to the detecting means and operable to produce a plurality of digital signals representing a plurality of comparative measurements of the quadrature components of each signal; and an array of logic elements coupled to the array of comparator means and operable to produce logical combinations of the plurality of comparative measurements from the array of comparator means to provide digital representations of the resultant of the quadrature components of each signal.

4. Receiving apparatus in accordance with claim 3 wherein said subtraction means includes first adding means having a first set of input connections coupled to the first storage means and a second set of input connections having a fixed predetermined set of input conditions applied thereto to cause the first adding means to produce a two's complement output of the digital representation in the first storage means; and second adding means having a first set of input connections coupled to the output of the first adding means and a second set of input connections coupled to the analog-to-digital converting means and operable to add the two's complement output of the first adding means to the digital representation from the analog-to-digital counting means whereby the second adding means produces a digital representation of the difference between the digital representation in the first storage means and the digital representation from the analog-to-digital converting means.

5. Receiving apparatus in accordance with claim 1 wherein said timing adjusting means includes difference detection means coupled to the subtraction means and operable to produce a first output signal in response to an output from the subtraction means indicating no difference between the digital representation in the first storage means and the digital representation from the analog-to-digital converting means and a second output signal in response to an output from the subtraction means indicating a difference between the digital representation in the first storage means and the digital representation from the analog-to-digital converting means;

difference counting means coupled to the difference detection means for producing indications in response to the first and second output signals from the difference detection means during a period equal to the period of a received signal;

accumulator means for accumulating data on indications received from the difference counting means; and accumulator readout means coupled to the accumulator means and to the control means for adjusting the times during the period of a received signal that the actuating signals are produced by the control means in response to predetermined accumulations of data on received indications in the accumulator means.

6. Receiving apparatus in accordance with claim 5 including timing means for producing a predetermined number of clock pulses during each period of a received signal; and wherein said control means includes control counting means coupled to the timing means and operable to repeatedly count through said predetermined number of clock pulses, said control counting means being operable to produce said actuating signals in response to particular predetermined accumulated counts therein; and said accumulator readout means is operable to add to or subtract from the count in said control counting means in response to predetermined accumulations of data on received indications in the accumulator means whereby the actuating signals occur at different times during the subsequent periods of received signals.

7. Receiving apparatus in accordance with claim 6 wherein said timing means produces an even number of clock pulses during each period of a received signal;

said control counting means is coupled to said difference counting means and is operable to set the difference counting means to a predetermined count in response to a particular accumulated count in the control counting means;

said difference counting means is operable to count in one direction in response to first output signals from said difference detection means and is operable to count in the opposite direction in response to second output signals from said difference detection means;

said difference counting means includes a readout means coupled to said control counting means and operable in response to the presence of said accumulated count in the control counting means to produce a first indication when the accumulated count in the difference counting means indicates a net count in the one direction, a second indication when the accumulated count in the difference counting means indicates a net count in the opposite direction, and no indication when said predetermined count is present in the difference counting means;

said accumulator means is operable to count in a first direction from a predetermined count in response to first indications from the difference counting means and to count in the opposite direction in response to second indications from the difference counting means;

said accumulator readout means is operable to produce a first signal condition in response to said accumulator means accumulating a net count of a predetermined number of first indications and to provide a second signal condition in response to said accumulator means accumulating a net count of a predetermined number of second indications; and said control counting means is operable to retard the accumulated count therein by one in response to a first signal condition from said accumulator readout means and to advance the accumulated count therein by one in response to a second signal condition from said accumulator readout means.

8. Receiving apparatus in accordance with claim 7 wherein the signals received at the detecting means are IF signals at a predetermined frequency; and said detecting means includes a source of reference frequency equal to said predetermined frequency;

quadrature hybrid means coupled to said source for producing two quadrature signals of the reference frequency; and mixing means coupled to the quadrature hybrid means for combining the IF signal with each of the two quadrature signals to provide the quadrature components of each received signal.

9. Receiving apparatus in accordance with claim 8 wherein said analog-to-digital converting means includes an array of comparator means coupled to the detecting means and operable to produce a plurality of digital signals representing a plurality of comparative measurements of the quadrature components of each signal; and an array of logic elements coupled to the array of comparator means and operable to produce logical combinations of the plurality of comparative measurements from the array of comparator means to provide digital representations of the resultant of the quadrature components of each signal.

10. Receiving apparatus in accordance with claim 9 wherein said subtraction means includes first adding means having a first set of input connections coupled to the first storage means and a second set of input connections having a fixed predetermined set of input conditions applied thereto to cause the first adding means to produce a two's complement output of the digital representation in the first storage means; and second adding means having a first set of input connections coupled to the output of the first adding means and a second set of input connections coupled to the analog-to-digital converting means and operable to add the two's complement output of the first adding means to the digital representation from the analog-to-digital counting means whereby the second adding means produces a digital representation of the difference between the digital representation in the first storage means and the digital representation from the analog-to-digital converting means.

* * * * *